3,169,122
BIS-PHENOL AZIRIDINECARBOXYLIC ESTERS
John H. Hennes, Lake Jackson, Tex., assignor to The Dow Chemical Company, Midland, Mich., a corporation of Delaware
No Drawing. Filed Sept. 4, 1959, Ser. No. 838,066
4 Claims. (Cl. 260—47)

This invention relates to esters of aziridinecarboxylic acids and dihydroxy compounds, to methods for producing such esters, to polymers of such esters and methods for producing such polymers.

The esters of the present invention are those corresponding to the generic formula

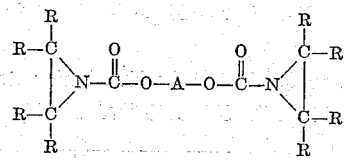

wherein A represents a bivalent organic coupling radical free of groups reactive with aziridines or chloroformates and each R represents hydrogen or a hydrogen radical and the R's may be the same or different.

Esters of the above type may be prepared by a variety of methods. Thus, the appropriate aziridine can be condensed with an equimolar amount of phosgene to produce an aziridinylchloroformate and 2 moles of the latter can then be condensed with one of a dihydroxy compound, HO—A—OH, to produce the desired ester. Alternatively, the bis-chloro-formate ester of the dihydroxy compound may be condensed with the appropriate aziridine. Other techniques of condensing the three components, the aziridine, the carbonic acid and the dihydroxy compound will be apparent to those skilled in the art. Aziridine and some of its homologs and analogs are known and the substituted aziridines useful in the present invention can, in general, be made by appropriate and obvious modifications of the processes by which the known aziridines have been made.

The preferred aziridines for use in making the esters of the present invention are aziridine itself and, those having the formula

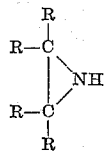

wherein at least two of the R's are hydrogen and the other two are hydrogen, alkyl or phenyl radicals. This preference arises from the fact that such aziridines are more readily available and the polymers of the esters derived therefrom in accordance with the present invention have better properties in some respects.

Suitable aziridines include specifically aziridine; 2-alkylaziridines, such as 2-methyl-, 2-ethyl-, 2-butyl-, 2-isopropyl-, 2-sec.-butyl-, 2-octyl-, 2-(2-octyl)- and 2-octadecyl-aziridine; 2-alkenylaziridines, such as 2-allyl-, 2-methallyl-, 2-oleyl- and 2-linoleylaziridine; 2-phenyl- and 2,3-diphenylaziridine and the corresponding chlorophenyl, bromophenyl and alkylphenylaziridines; 2,3-dialkylaziridines, such as 2,3-dimethyl-, diethyl-, dioctyl- and diocta-decylaziridine; 2,2-dialkylaziridines, such as 2,2-dimethyl-, diethyl-, dibutyl- and didecylaziridine; and the isomeric tri- and tetra-alkylaziridines. When the aziridine contains two or more substituents on the aziridine ring these may be the same or different alkyl, aryl or other hydrocarbon radicals. As a practical matter, it is preferred that any aryl substituents be of the benzene series; i.e., free of fused aromatic rings.

The bivalent coupling radical, A, in the above formula may be considered as derived, directly or indirectly, from the corresponding dihydroxy compound, HO—A—OH. This may be an aliphatic glycol, such as an alkylene glycol, as for example, ethylene glycol, propylene glycol, trimethylene glycol, 1,2- or 2,3-butylene glycol, 1,3- or 1,4-butanediol, hexylene glycol, or the like; a bis(hydroxyalkyl) aryl compound, such as bis(hydroxymethyl)benzene, bis(2-hydroxyethyl)benzene, bis(2-hydroxyethoxy)benzene, bis(hydroxymethylphenyl), bis(2-hydroxyethoxyphenyl) oxide, bis(2-hydroxypropylphenyl)methane, isopropylidene-bis(2-hydroxyethoxybenzene) and the like; a bisphenol, such as bisphenol, methylenebisphenol, isopropylidenebisphenol, oxybisphenol, bis(hydroxybenzyl) benzene and the like; or a polyoxyalkylene glycol, such as diethylene glycol, dipropylene glycol, tris(oxymethylene) glycol, tributylene glycol or the higher polyoxyalkylene glycols containing up to several hundred oxyalkylene units or substantially any dihydroxy compound free of substituents reactive with aziridines or chloroformates.

Preparation of the aziridines of the invention is illustrated by the following examples.

*Example 1*

Ethylene bis-chloroformate (93.5 grams, 0.50 mole) was dissolved in 100 ml. of benzene and added dropwise to a cooled solution of aziridine (43 grams, 1.0 mole), triethylamine (101.2 grams, 1.0 mole) and benzene (300 ml.). The reaction mixture was allowed to warm up to room temperature while stirring was continued. The triethylamine hydrochloride was removed by filtration and the benzene distilled from the resultant filtrate under vacuum. After removal of the benzene the product was left as a colorless mobile liquid which slowly solidified. Yield 98.1 grams, 98 percent. The determination of physical constants was difficult because the compound slowly polymerized on standing. The solid ethylene bis-aziridinylformate as originally obtained was soluble in all the common organic solvents, however, after standing for about a week it was insoluble in these same solvents. In the same manner it melted in the neighborhood of 40–50° C. originally but after standing it could be heated to 250° C. without melting.

*Nitrogen analysis.*—Found 13.48 percent; calculated 13.99 percent.

*Infrared analysis.*—Urethane carbonyl at 5.8 microns, ester oxygen at 8.4 microns.

The ethylene bis-aziridinylformate gradually becomes more viscous on standing, and over a long period, or with heating, forms a colorless solid homopolymer.

*Example 2*

The bis-chloroformate of tetraethylene glycol was prepared by reacting tetraethylene glycol with phosgene. This product (159 grams, 0.5 mole) had a chlorine analysis of 22.5 percent; calculated 22.2 percent, and was added dropwise to a benzene solution of aziridine (43 grams, 1 mole) and triethylamine (200 grams, 2.0 mole). After removal of the triethylamine hydrochloride, excess triethylamine and benzene the product was obtained as a viscous liquid in 96 percent yield. It is soluble in methanol, slightly soluble in benzene and insoluble in ether. It had a refractive index of 1.485 at 25° C.

Example 3

The bis-chloroformate of bisphenol A was prepared by reacting the phenol with an excess of phosgene. This was then condensed with aziridine substantially as in the preceding examples to produce the bis-aziridinylformate of bisphenol A.

In the above examples triethylamine was used as an HCl acceptor. However other bases, either organic or inorganic, can be similarly used, such as other amines or alkali or alkaline earth metal hydroxides or carbonates. Likewise, other inert solvents, such as toluene, xylene, chloroform, carbon tetrachloride, diethyl ether, or the like, may be used.

The aziridine carboxylic esters of the invention are in general colorless liquids or low-melting solids having low vapor pressures; hence they can be distilled only under high vacuum if at all. They polymerize readily upon mild heating, or even on standing at room temperature. The polymer initially formed is soluble and thermoplastic but is easily converted by mild warming, or even by standing at room temperature, into an insoluble, infusible solid polymer. The monomeric bis-aziridinecarboxylic esters can thus be homopolymerized or they can be copolymerized one with another or with monoaziridinyl compounds. Among the latter are the alkyl esters of aziridinecarboxylic acid (alkylaziridinylformates). All these polymers and copolymers are species of polyurethane resins and are generally suitable for the same uses as the other known polyurethanes.

The esters of the invention are useful for modifying the properties of natural and synthetic fibers having reactive hydrogen atoms, especially hydroxyl- or amino-hydrogen, such as cotton, viscose rayon, wool, etc. They are, moreover, useful in the tanning of hides and skins.

I claim:
1. The compound having the formula

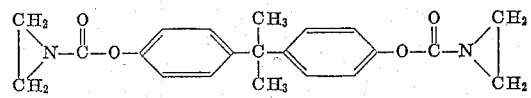

2. An aziridinecarboxylic ester having the formula

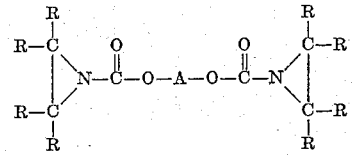

wherein A represents the radical formed by the removal of two phenolic hydroxyl groups from a bis-phenol and each R is a radical independently selected from the group consisting of hydrogen and hydrocarbon radicals.

3. An ester as defined in claim 2 wherein the bisphenol is 4,4'-isopropylidenebisphenol.

4. A resin comprising a polymer of the ester defined in claim 2.

References Cited in the file of this patent

UNITED STATES PATENTS

| | | |
|---|---|---|
| 2,265,416 | Bestian | Dec. 9, 1941 |
| 2,655,494 | Kropa | Oct. 13, 1953 |
| 2,708,617 | Magat | May 17, 1955 |
| 2,800,464 | Miller | July 23, 1957 |

FOREIGN PATENTS

| | | |
|---|---|---|
| 899,955 | France | Nov. 22, 1943 |
| 900,137 | Germany | Dec. 21, 1953 |
| 63,864 | Netherlands | Mar. 15, 1949 |